Patented June 26, 1945

2,379,039

UNITED STATES PATENT OFFICE 2,379,039

TERPENE DERIVATIVES

Alfred L. Rummelsburg, Wilmington, Del., assignor to Hercules Powder Company, Wilmington, Del., a corporation of Delaware No Drawing. Original application May 31, 1941, Serial No. 396,222. Divided and this application March 19, 1942, Serial No. 435,299

11 Claims. (Cl. 260—72)

This invention relates to a new series of terpene derivatives and more particularly to a new series of terpene derivatives resulting from the reaction of various amines with an acyclic terpene having three double bonds per molecule or the condensation product of such an acyclic terpene with crotonaldehyde. Hereinafter, in this specification an acyclic terpene having three double bonds per molecule will be referred to for convenience as an acyclic terpene.

By the method in accordance with this invention, a primary or secondary amine is reacted with an acyclic terpene, a polymerized acyclic terpene or a condensation product of an acyclic terpene with crotonaldehyde, at an elevated temperature for a period designed to promote substantially complete reaction. An acid condensation catalyst will be employed under conditions to be hereinafter described. The resulting products are, in general, dark colored, viscous oils and resins which find particular use as accelerators in the vulcanization of rubber and as intermediates in the preparation of vulcanization accelerators.

In accordance with this invention any acyclic terpene of the empirical formula $C_{10}H_{16}$, having three double bonds per molecule, may be employed. Thus, allo-ocimene, ocimene or myrcene may be employed. In particular, it is preferred to employ allo-ocimene. This particular acyclic terpene, in addition to having three double bonds, has them in a triply conjugated position in the molecule.

As stated hereinabove, the acyclic terpenes may, if desired, be employed in polymeric form. To obtain the polymeric forms from the monomers any of the processes known in the art are contemplated. Thus, for example, in the case of allo-ocimene, it is desired to include allo-ocimene polymerized with phosphoric acid catalysts, such as, orthophosphoric acid, tetraphosphoric acid, hypophosphoric acid, metaphosphoric acid, pyrophosphoric acid, etc.; metal halide catalysts, such as, stannic chloride, aluminum chloride, zinc chloride, boron trifluoride and its molecular complexes with ethers and acids, etc.; acids, such as, sulfuric, hydrofluoric, p-toluene sulfonic acid, etc.; and adsorbents, such as, fuller's earth, bauxite, silica gel, alumina, activated magnesium silicates, etc. The polymerization may be carried out with or without the use of an inert, volatile, organic solvent, such as, benzene, xylene, gasoline, ethylene dichloride, etc. For additional information relating to particular procedures which may be employed, see my copending applications for United States Letters Patent, Serial No. 370,664, filed December 18, 1940, and Serial No. 370,665, filed December 18, 1940.

Of the various polymeric forms of acyclic terpenes, the substantially pure dimer will preferably be employed in the condensation with the desired amine in accordance with this invention. Thus, for example, when allo-ocimene is polymerized in the presence of a phosphoric acid catalyst, a liquid product is formed consisting of a substantial quantity of the dimer. It has been found that the liquid product, after removal of the catalyst, will contain from about 75% to about 95% of the dimer, depending upon the conditions of reaction, such as, type of phosphoric acid employed, the concentration of catalyst, the particular solvent, the reaction temperature, etc. The thiocyanate value of the product may vary from about 120 to about 240. If desired, the product may be distilled prior to use, preferably in vacuo and over a small amount of alkali. Thereby, traces of higher polymers, catalysts and oxidation products present as impurities can be removed. The pure dimer has the following characteristics:

B. P. (4 mm.) _____ ° C__ 142–143
$d_o^{23}$ _____ 0.8654
$n_d^{23}$ _____ 1.508

In carrying out the polymerization with metal halide catalysts, liquid polymers may also be obtained following the procedure of my application for United States Letters Patent, Serial No. 370,664, filed December 18, 1940; however, by employing particular metal halides and suitably controlling the conditions of reaction, solid polymers of allo-ocimene can result. For example, when a metal chloride, and preferably aluminum chloride, is used, generally solid polymers result. Preferably, however, to form solid polymers the reaction is carried out between about −35° C. and about 60° C. with the allo-ocimene dissolved in a halogenated organic solvent, such as, ethylene dichloride, etc. These solid polymers contain at least about 75% of polymeric constituents higher than the dimer and are further characterized by having thiocyanate values between the range of from about 20 to about 80.

As hereinbefore stated, a condensation product of an acyclic terpene with crotonaldehyde may be employed as one of the reactants in accordance with the present invention. Acyclic terpenes form addition products with crotonaldehyde by a Diels-Alder reaction to give well-defined compounds. These addition products are unsaturated, cyclic aldehydes and are obtained in as high as 70% yields by heating the acyclic terpene with crotonaldehyde at an elevated temperature such as 200° C. for several hours. Preferably, an excess of crotonaldehyde will be employed. In the reaction which takes place one molecule of the acyclic terpene may react with one molecule of crotonaldehyde or two molecules of the former may react with one of the latter or vice versa. The extent to which each of these reactions takes place will depend upon the relative proportions of the reactants and the conditions of reaction. Furthermore, during this reaction any of the above compounds or the reactants may polymerize. The compound which will greatly predominate in the mixture will be that formed when one molecule of the acyclic terpene condenses with one molecule of crotonaldehyde, particularly so when the latter is used in slight excess. This same compound can, if desired, be separated from the other constituents by vacuum distillation or other desirable method.

As an example of this condensation reaction, approximately equi-molar proportions of allo-ocimene and crotonaldehyde may be heated together at 200° C. for say 2.5 hours. The compound representing the combination of equimolar proportions of the reactants may be separated and will be found to be a fairly viscous, yellowish liquid having the following average characteristics:

B. P. (3 mm.) _____°C__ 117–119
$n_d^{17}$ _____ 1.4952
$d_0^{17}$ _____ 0.9256

It is this compound which is contemplated wherever, hereinafter, use is made of "the allo-ocimene-crotonaldehyde condensate." It may be otherwise referred to as trimethyl-butenyl-tetrahydrobenzaldehyde. However, if desired, the crude condensate may itself be employed in the processes of this invention, as may any of the compounds separable therefrom.

The amines which may be employed in accordance with the invention comprise both primary and secondary amines, and both aliphatic and aromatic amines. For example, aromatic primary amines, such as, aniline, toluidine, phenylenediamine, naphthylamine, amino-biphenyl, xylidine, mesidine, cumidine, benzylamine, phenylethylamine, etc.; aromatic secondary amines, such as methylaniline, ethylaniline, propylaniline, butylaniline, amylaniline, methyltoluidine, ethyltoluidine, etc.; aliphatic primary amines, such as, methylamine, ethylamine, propylamine, butylamine, amylamine, ethylenediamine, hexamethylenediamine, isopropylamine, monoethanolamine, monoisopropanolamine, etc.; aliphatic secondary amines, such as, dimethylamine, diethylamine, diethanolamine, methylethylamine, etc., may be employed. Generally, the secondary amines react less readily than do the primary amines; hence, where secondary amines are employed, higher temperatures and longer periods of reaction are required. Furthermore, aliphatic amines generally react less readily than do the aromatic amines, hence where aliphatic amines are employed, higher temperatures and longer periods of reaction are required.

In preparing the condensation product of a monomeric or polymeric acyclic terpene with a desired amine, the reactants are heated together, preferably with agitation, in the presence of an acid condensation catalyst at a temperature within the range of from about 150° C. to about 250° C. for a period of from about 1 hour to about 24 hours. Preferably, a temperature within the range of from about 175° C. to about 225° C. for a period of from about 6 hours to about 10 hours will be used. The use of a closed system is necessary if a reaction temperature appreciably above 190° C. is employed. Also, if the boiling point of the particular amine is too low to permit the desired reaction temperature, a closed system is required.

With respect to the acyclic terpene, the amine may be employed in equi-molar or other than equi-molar proportions, although in the reaction which ensues it is believed equi-molar proportions of the materials react. Moreover, it is preferred to employ the amine in an amount corresponding with between about a 25% and about a 100% excess of equi-molar proportions. The acid condensation catalysts which will be employed comprise hydrochloric acid, sulfuric acid, orthophosphoric acid, tetraphosphoric acid, fluoboric acid, hydrofluoric acid, perchloric acid, trichloracetic acid, chloraluminic acid, aromatic sulfonic acids, such as, p-toluene sulfonic acid, etc. Equivalently, the various amine salts of the aforesaid acids may be employed as catalysts, for example, aniline hydrochloride, etc. In addition, it has been found that metal halides, such as, zinc chloride, will accomplish the desired result, but are not as desirable as the aforementioned catalysts. The amount of catalyst employed will be not greater than about 15% based on the combined weight of the reactants. Preferably, the amount of catalyst employed will be within the range of from about 0.5% to about 10% based on the combined weight of the reactants. These ranges are based on the aforesaid acid catalysts, or as the case may be, metal halide catalysts. If an amine salt of an acid is employed as catalyst, correspondingly large quantities will be employed.

Following the reaction period, the mixture will be suitably treated to remove the excess amine. For example, in the case of aniline, the mixture may be either steam or vacuo distilled to remove the excess aniline. The catalyst may be removed either prior to or after removal of the excess amine, but it is preferably removed prior to removal of excess amine. This catalyst removal will preferably be accomplished by a combination of caustic washing and water washing.

Inert solvents may be employed if desired during the condensation and/or during the purification of the products. They may comprise benzene, toluene, gasoline, cyclohexane, decahydronaphthalene, chlorobenzene, ethylene dichloride, chloroform, etc. The use of an inert solvent will reduce the viscosity and permit adequate contact.

When an acyclic terpene-crotonaldehyde condensate is employed in the reaction with a desired primary amine, any of the condensates hereinbefore mentioned may be employed, however, it is preferred to employ the condensate resulting when one molecule of acyclic terpene condenses with one molecule of crotonaldehyde. Employing such a condensate, different reaction products with primary amines are formed, depending upon the proportion of reactants, the temperature employed, and the period of reaction. Thus, equi-molar proportions of the condensate and the primary amine react when the mixture is heated, preferably with agitation, at a temperature within the range of from about 150° C. to about 250° C. for a period of from about 1 hour to about 24 hours. Preferably, a temperature within the range of from about 150° C. to about 200° C. for from about 3 hours to about 8 hours will be employed. No catalyst need be employed in the reaction. Here again, a closed system is necessary where the temperature is above the boiling point of one or both of the reactants. If a closed system is used, the water can be bled off occasionally through a suitable valve.

The acyclic terpene-crotonaldehyde condensate resulting when one molecule of terpene reacts with one molecule of crotonaldehyde and the primary amine will be employed in equi-molar or other than equi-molar proportions. However, it is preferred to employ the primary amine in an amount corresponding with between about a 25% and a 100% excess of equi-molar proportions. Condensation occurs between the aldehyde group and the primary amino-group with the elimination of water. Following the reaction period, the unreacted constituents may be removed by steam or vacuo distillation. As in the case where the acyclic terpene is employed instead of the condensate, inert solvents may be employed for the reactants if desired. For example, in the instance where "the allo-ocimene-crotonaldehyde condensate" is employed the product is a trimethyl-butenyl-tetrahydrobenzal derivative of the particular primary amine employed. Thus, where aniline is employed, the product is trimethyl-butenyl-tetrahydrobenzalaniline.

Now, in addition to the reaction products obtained when equi-molar proportions of the acyclic terpene-crotonaldehyde condensate resulting when one molecule of crotonaldehyde reacts with one molecule of acyclic terpene and a primary amine combine, it is possible to accomplish the condensation of two molecules of a primary amine and one molecule of acyclic terpene-crotonaldehyde condensate. Procedures similar to those employed to accomplish the condensation of equi-molar proportions of the reactants will be employed, except that an excess of from about 200% to about 400% of the primary amine is employed. In addition, a temperature of from about 200° C. to about 250° C. will be used and heating will be continued at this temperature for from about 1 to about 8 hours after formation of water vapor has ceased. Unreacted constituents are removed as heretofore described, by steam or vacuo distillation. It will be realized that this reaction does not proceed quantitatively according to theory, and that the product will contain, for example, in the case where allo-ocimene is the terpene constituent, the product of the condensation of equi-molar proportions of "the allo-ocimene-crotonaldehyde condensate" and the primary amine in addition to the condensation product resulting where two moles of primary amine condense with one mole of "the allo-ocimene-crotonaldehyde condensate."

It is possible in accordance with this invention to produce more highly complex reaction products by employing as the starting material any condensation product of "the allo-ocimene-crotonaldehyde condensate" with a primary amine. Equivalently, condensation products of other acyclic terpene-crotonaldehyde condensates with primary amines may be employed. To any such condensation product, after a suitable excess of primary amine has been established in the reaction mixture, an acid condensation catalyst or suitable metal halide condensation catalyst may be added, and the resulting mixture treated in accordance with the procedure outlined previously for the condensation of an acyclic terpene or a polymerized acyclic terpene with an amine. The acid catalyst will accomplish reaction of the excess primary amine at the unsaturated double bonds of the condensation products first formed before the addition of the catalyst. If desired, secondary amines may be employed for this additional condensation, but they are less preferable than the primary amines.

The reaction products of this invention, with the exception of the products contemplated in the paragraph immediately supra, are in general dark colored viscous oils and resins. They are characterized by containing between about 3.0% and about 10.0% of combined nitrogen.

There follow several examples which illustrate specific embodiments of the processes of this invention which, however, are not to be taken as being limiting. All parts and percentages in this specification and claims attached are by weight unless otherwise indicated.

Example 1

In this example an allo-ocimene-crotonaldehyde condensate was employed which contained 90% of the monomer of the product resulting when equi-molar proportions of allo-ocimene and crotonaldehyde are condensed. In other words, this condensate was 90% pure trimethyl-butenyl-tetrahydrobenzaldehyde. Fifty parts of said condensate, and 21 parts of aniline were mixed and allowed to stand for about 15 hours at room temperature. The mixture was then heated at 100° C. for 3 hours allowing the water as formed to pass off. The reaction product was vacuo distilled at 5 mm. until a vapor temperature of 130° C. was reached. There remained 55 parts of a viscous resin which upon analysis was shown to contain 4.2% nitrogen. A Rast molecular weight determination gave 230 as compared with a theoretical of 271 for the condensation product of equi-molar proportions of trimethyl-butenyl-tetrahydrobenzaldehyde and aniline.

Example 2

In this example a monomeric allo-ocimene-crotonaldehyde condensate was employed which was 94% pure with respect to the product formed when equi-molar proportions of allo-ocimene and crotonaldehyde react. In other words this product was 94% pure trimethyl-butenyl-tetrahydrobenzaldehyde. Two hundred and ten parts of this condensate and 400 parts of toluidine were heated at 200° C. for a period of 18 hours in an atmosphere of $CO_2$, allowing the water to pass off as formed. The reaction mixture was distilled at 3 mm. to remove unreacted constituents until a final bath temperature of 210° C. was reached. Three hundred and forty parts of a dark colored viscous resin containing 5.9% nitrogen remained. A Rast molecular weight determination gave 250 as compared with a theoretical of 285 for the condensation product of equi-molar proportions of trimethyl-butenyl-tetrahydrobenzaldehyde and toluidine.

In addition to the methods of purifying the products of the invention, hereinbefore mentioned, further refinements may be employed, such as, treatment with a suitable activated adsorbent, such as, activated carbon, fuller's earth, bauxite, silica gel, alumina, magnesium silicates, etc. The use of an inert atmosphere, such as $CO_2$, $N_2$, etc., during the reaction will assist in obtaining products of improved color.

The products of the invention are particularly useful as accelerators in the vulcanization of rubber, and as intermediates in the preparation of vulcanization accelerators. They may also be employed as modifiers in the preparation of aromatic amine-formaldehyde resins. Upon sulfonation with the usual sulfonating agents, the condensation products of this invention, particularly those containing aromatic groups, are converted in materials having wetting, emulsifying and detersive properties. The alkali metal salts of the sulfonation products have similar properties.

This application forms a division of my application, Serial No. 396,222, filed May 31, 1941, entitled "Terpene derivatives," and now issued as Patent No. 2,341,294 of February 8, 1944.

What I claim and desire to protect by Letters Patent is:

1. A reaction product obtained by heating to a temperature of about 150° C. to about 250° C., in the presence of an acid condensation catalyst, a material selected from the group consisting of primary and secondary amines in at least an equi-molar quantity with a diene condensation product formed from about 1 to about 2 moles of an acyclic terpene having three double bonds per molecule with from about 2 to about 1 moles of crotonaldehyde.

2. A reaction product obtained by heating to a temperature of about 150° C. to about 250° C., in the presence of an acid condensation catalyst, a primary aromatic amine in at least an equi-molar quantity with the diene condensation product formed from equi-molar proportions of allo-ocimene and crotonaldehyde and having a boiling point of about 117° C. to about 119° C. at a pressure of 3 mm.

3. A reaction product obtained by heating to a temperature of about 150° C. to about 250° C., in the presence of an acid condensation catalyst, aniline in at least an equi-molar quantity with the diene condensation product formed from equi-molar proportions of allo-ocimene and crotonaldehyde and having a boiling point of about 117° C. to about 119° C. at a pressure of 3 mm.

4. A reaction product obtained by heating to a temperature of about 150° C. to about 250° C., in the presence of an acid condensation catalyst, toluidine in at least an equi-molar quantity with the diene condensation product formed from equi-molar proportions of allo-ocimene and crotonaldehyde and having a boiling point of about 117° C. to about 119° C. at a pressure of 3 mm.

5. A reaction product obtained by heating to a temperature of about 150° C. to about 250° C., in the presence of an acid condensation catalyst, a primary aliphatic amine in at least an equi-molar quantity with the diene condensation product formed from equi-molar proportions of allo-ocimene and crotonaldehyde and having a boiling point of about 117° C. to about 119° C. at a pressure of 3 mm.

6. The process for making a new composition of matter which comprises reacting, at a temperature of from about 150° C. to about 250° C. and in the presence of an acid condensation catalyst, a material selected from the group consisting of primary and secondary amines in at least an equi-molar quantity with a diene condensation product formed from about 1 to about 2 moles of an acyclic terpene having three double bonds per molecule with from about 2 to about 1 moles of crotonaldehyde.

7. The process for making a new composition of matter which comprises reacting, at a temperature of from about 150° C. to about 250° C. and in the presence of an acid condensation catalyst, a material selected from the group consisting of primary and secondary amines in at least an equi-molar quantity with the diene condensation product formed from equi-molar proportions of allo-ocimene and crotonaldehyde and having a boiling point of about 117° C. to about 119° C. at a pressure of 3 mm.

8. The process for making a new composition of matter which comprises reacting, at a temperature of from about 150° C. to about 250° C. and in the presence of an acid condensation catalyst, a primary aromatic amine in at least an equi-molar quantity with the diene condensation product formed from equi-molar proportions of allo-ocimene and crotonaldehyde and having a boiling point of about 117° C. to about 119° C. at a pressure of 3 mm.

9. The process for making a new composition of matter which comprises reacting, at a temperature of from about 150° C. to about 250° C. and in the presence of an acid condensation catalyst, a primary aliphatic amine in at least an equi-molar quantity with the diene condensation product formed from equi-molar proportions of allo-ocimene and crotonaldehyde and having a boiling point of about 117° C. to about 119° C. at a pressure of 3 mm.

10. The process for making a new composition of matter which comprises reacting, at a temperature of from about 150° C. to about 250° C. and in the presence of an acid condensation catalyst for a period of from about 1 hour to about 24 hours, a primary aromatic amine in at least an equi-molar quantity with the diene condensation product formed from equi-molar proportions of allo-ocimene and crotonaldehyde and having a boiling point of about 117° C. to about 119° C. at a pressure of 3 mm.

11. The process for making a new composition of matter which comprises reacting, at a temperature of from about 150° C. to about 250° C. and in the presence of an acid condensation catalyst for a period of from about 3 hours to about 8 hours, a primary aromatic amine in at least an equi-molar quantity with the diene condensation product formed from equi-molar proportions of allo-ocimene and crotonaldehyde and having a boiling point of about 117° C. to about 119° C. at a pressure of 3 mm.

ALFRED L. RUMMELSBURG.